Nov. 24, 1925.
J. F. PRESLEY
VEHICLE SEAT
Filed Nov. 3, 1922
1,562,658
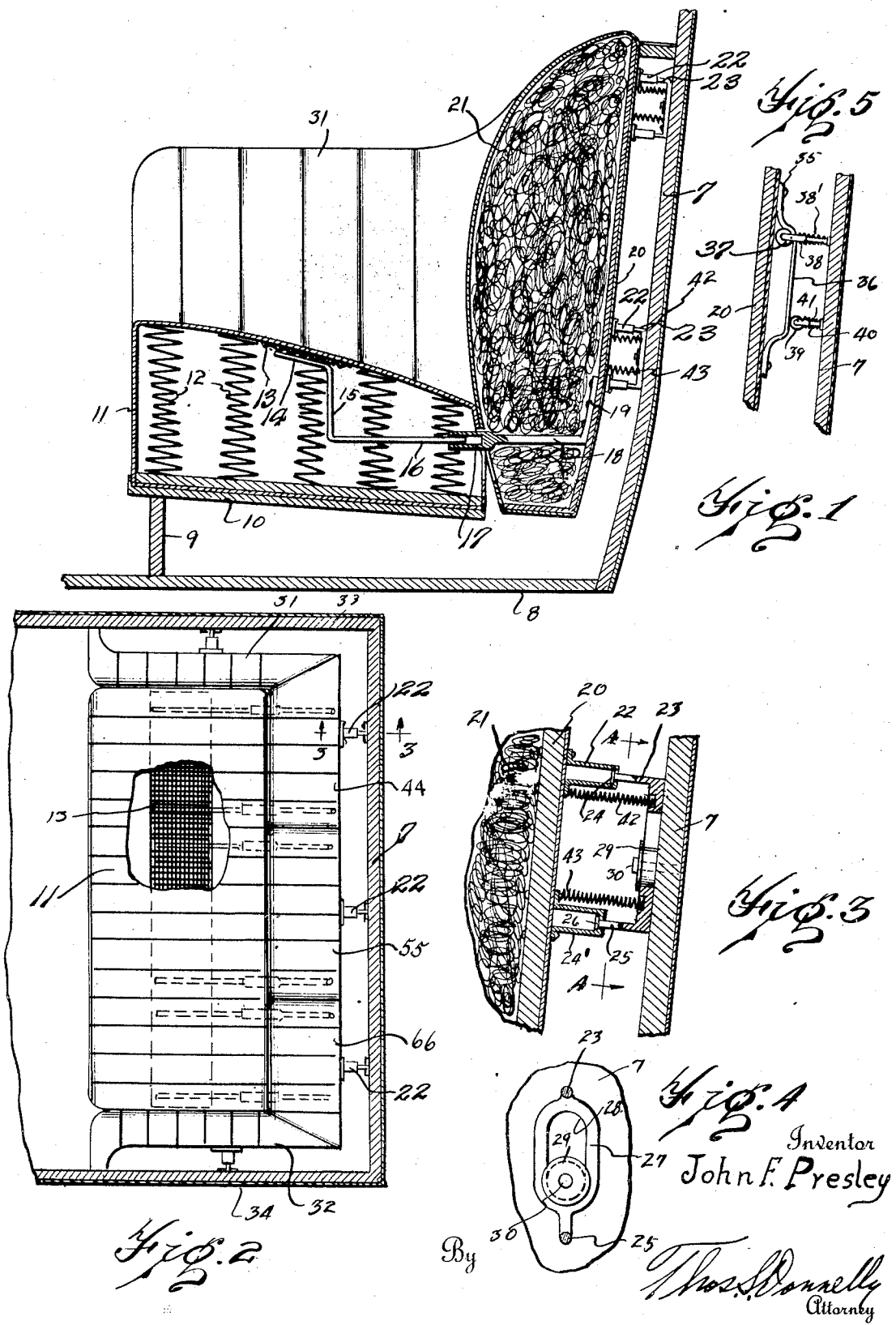

Patented Nov. 24, 1925.

1,562,658

UNITED STATES PATENT OFFICE.

JOHN F. PRESLEY, OF DETROIT, MICHIGAN.

VEHICLE SEAT.

Application filed November 3, 1922. Serial No. 598,819.

*To all whom it may concern:*

Be it known that I, JOHN F. PRESLEY, a citizen of the United States, residing at Detroit, in the county of Wayne and State of Michigan, have invented a new and useful Improvement in a Vehicle Seat, of which the following is a specification.

My invention relates to a new and useful improvement in a vehicle seat, and has for its object the elimination of the rubbing of the rider's body against the seat and rear cushions of the seat and to this end provides means for moving the rear and side cushions of the vehicle seat simultaneously and in accordance with the movements of the body of the rider.

Another object of the invention is the provision in a vehicle seat, of means for moving the rear and side of the vehicle seat vertically in response to and in accordance with any upward or downward movement of the seat cushion of the vehicle and particularly any upward or downward movement of the upper surface of the cushion of the vehicle seat.

Another object of the invention is the provision in a vehicle seat, of means for permitting the movement of the back of the seat rearwardly of the base thereof, to absorb the longitudinal shocks directed to the body of the rider while in the vehicle.

Another object of the invention is the provision in a vehicle seat, of means for transmitting to the back and the sides of the said seat, any downward or upward movement transmitted to the base of said seat.

Other objects will appear hereinafter.

The invention consists in the combinations and arrangements of parts hereinafter set forth and described.

The invention will be best understood by a reference to the accompanying drawings, which form a part of this specification and in which, Fig. 1 is a central vertical sectional view of the invention, Fig. 2 is a top plan view of the invention, Fig. 3 is a sectional view taken on substantially line 3—3 of Fig. 2, Fig. 4 is an elevational view illustrating the slide guide member used in the invention, and Fig. 5 is a sectional view illustrating in side elevation, a modified form of a slide guide member.

The invention in its preferred form is adapted for use particularly in conjunction with automobile seats, although it will appear as the description proceeds, that it may be used equally well with other types of vehicle seats. As shown in the drawings, there is present the usual back 7 of the vehicle seat having the base 8, which is supported on the conventional type of supporting members. Projecting upwardly from the member 8 is a supporting member 9, which serves to support the cushion receiving portion 10. In this application, the term "cushion," when used, will relate particularly to the base of the seat, or that portion of the cushion upon which the rider sits. The cushion 11 of the seat is provided, within the usual leather covering, with coil springs 12 which serve to maintain the cushion normally in its upwardly pressed position. Mounted upon the covering and extending longitudinally of the cushion, is a wire netting 13 which is preferably positioned centrally of the cushion. Secured to the wire netting 13 is an angularly turned portion 14 of a rod or member which carries the downwardly projecting portion 15 which is angularly turned to present a longitudinally extending portion 16, the end of which is adapted for slidable engagement in a socket 17, carried by an arm 18 which has the angularly turned portion 19 securely fastened to the rear wall 20 of the seat back 21, which is suitably upholstered. Secured to the member 20 at intervals is a socket 22, in which is slidably positioned a leg 23, carrying at its free end an enlargement of head 24 which prevents the withdrawal of the member 23 from the socket 22. A cooperating socket 24' is also mounted upon the member 20; slidably positioned within the socket 24 is a leg 25 carrying at its free end a head 26, said legs 23 and 25 projecting forwardly from a guide member 27 which is secured to the member 7 and is provided with an elongated vertically extended slot 28 in which is positioned a roller 29 mounted upon a suitable stud or bolt 30 which is secured in or to the member 7.

The construction is such that when the rider sits upon the cushion the leather cover is depressed and the springs 12 are compressed. When the covering is moved downwardly the wire mesh 13 is forced downwardly, thereby moving the arm 16 in a downward direction. This arm in its movement downwardly carries or forces the upholstered portion 21, together with the upholstered sides 31 and 32 downwardly. The sides 31 and 32 are each provided with the guide members as shown in Fig. 2. These guide members are mounted upon the sides 33 and 34 of the seat and the slot formed therein is adapted to allow downward and upward movement of the sides and in addition thereto to allow rearward and forward movement thereof, the opening 28 being in this case substantially circular. As the cover of the cushion is depressed, the back and sides moving downwardly carry the member 27 downwardly relatively to the roller 29.

The construction is also such that shocks delivered toward the driver, forcing the body of the driver to the rear, such as is customarily the case when a rut or a small obstruction is met by the vehicle in its travel, are absorbed by the upholstered portion of the seat, inasmuch as the upholstered portion is allowed to move bodily rearwardly and forwardly of the member 7 within certain limits. When a rearward thrust is delivered to the body of the rider, the upholstered portion 21 moves rearwardly of the said back 7, thus causing a telescoping of the legs 23 and 25 in the sockets 22 and 24. Positioned between the member 20 and the member 27 are coil springs 42 and 43 which serve to restore the back and sides of the seat to normal position after the rearward force is relieved.

In the form shown in Fig. 5, I have provided a modified method of guiding the upholstered portion of the seat in its vertical movements. Mounted upon the member 20 is a strap of metal 35 which is provided with a bowed portion 36 permitting the placement of a roller 37 between the member 20 and the member 36, said roller being carried upon a U-shaped member 38 which is mounted on the member 7. Co-operating with the bowed portion 36 is a roller 39 adapted to engage the outer surface of the bowed portion 36. The roller 39 is mounted upon a U-shaped member having telescoping legs and provided with a spiral spring 41 for retaining said member in its normal position. The U-shaped member 38 is also telescopical and provided with a spiral spring 38'.

I am aware that attempts have been made to provide a vehicle seat having means for accounting for the upward and downward movement of the rider so as to prevent the rubbing of the rider's body against the side and the rear of the seat, but in the present invention I have provided means whereby any slight movement of the cushion of the seat vertically will cause a vertical movement of the sides and the back of the seat. In this connection it will be noted that the sides and the back of the seat move vertically in response to any movement vertically of the cover of the cushion so that if it is desired to upholster the cushion of the seat as well as to provide it with springs the movement which would cause a further depression of the upholstered portion of the cushion without a movement or further compression of the springs of the cushion will be transmitted to the sides and back of the seat and cause a vertical movement thereof in accordance therewith. It will be noted that the back of the seat is formed of three separate parts, to wit, 44, 55 and 66, each of which may move vertically independent of the other in response to any movement of the cushion immediately in front of it. The number of parts into which the back of the seat may be divided is of course optional with the builder and depends upon the number of persons the seat is built to accommodate.

While I have illustrated and described the preferred form of construction I do not wish to limit myself to the precise form shown but desire to avail myself of such variations and modifications as come within the scope of the appended claims.

Having thus described my invention, what I claim is new and desire to secure by Letters Patent is:

1. In a vehicle seat having sides and a back, an auxiliary back to the rear of and spaced from said seat back; a U shaped member mounted on said auxiliary back and adapted for vertical movement relatively thereto; a pair of socket bearing members mounted on said seat back and adapted to receive the legs of said U shaped member to permit the approach and withdrawal of said seat back to and from said auxiliary back; and resilient means connected to said U shaped member and said seat back for normally assisting the withdrawal of the one from the other.

2. In a vehicle seat, comprising sides and a back, a stationary auxiliary back positioned behind and spaced from the back of said seat; a U shaped member mounted on said auxiliary back for vertical movement relatively thereto, the bight of said U-shaped member having a slot formed therein and the leg portions each having a peripheral flange on the end thereof; a roller bearing member mounted on said auxiliary back and projected through said slot in engagement with said bight for supporting said U-shaped member; tubular members mounted on said seat back and adapted for reception of the legs of said U-shaped member; and an inwardly directed flange mounted on the end of said tubular members for engaging the peripheral flange on the end of said legs for preventing the withdrawal of said legs from said tubular member.

In testimony whereof I have hereunto set my hand at Detroit, in the county of Wayne and State of Michigan.

JOHN F. PRESLEY.